United States Patent
Neumann

(10) Patent No.: US 7,528,526 B2
(45) Date of Patent: May 5, 2009

(54) PIEZOELECTRIC DRIVE UNIT AND METHOD FOR GENERATING A PREFERABLY ROTATING DRIVE MOVEMENT FOR SUCH A DRIVE UNIT

(75) Inventor: Rudolf Neumann, Spaichingen (DE)

(73) Assignee: Minebea Co., Ltd., Nagano-ken (JP)

( * ) Notice: Subject to any disclaimer, the term of this patent is extended or adjusted under 35 U.S.C. 154(b) by 2 days.

(21) Appl. No.: 10/587,311

(22) PCT Filed: Jan. 26, 2005

(86) PCT No.: PCT/EP2005/000737

§ 371 (c)(1),
(2), (4) Date: Apr. 9, 2007

(87) PCT Pub. No.: WO2005/074051

PCT Pub. Date: Aug. 11, 2005

(65) Prior Publication Data
US 2008/0030103 A1      Feb. 7, 2008

(30) Foreign Application Priority Data
Jan. 28, 2004  (DE) ................. 10 2004 004 148
Dec. 30, 2004  (DE) ................. 10 2004 063 549

(51) Int. Cl.
*H01L 41/08*     (2006.01)
(52) U.S. Cl. ................................. 310/323.01
(58) Field of Classification Search ............ 310/323.03, 310/323.04, 323.06, 323.08, 323.01, 90; 384/119; *H02N 2/00, 2/12; H01L 41/08*
See application file for complete search history.

(56) References Cited

U.S. PATENT DOCUMENTS 5,066,144 A *  11/1991  Ide .............................. 384/119
5,238,308 A *  8/1993  Lang et al. ................... 384/119

FOREIGN PATENT DOCUMENTS

JP        64-008879     * 12/1989

OTHER PUBLICATIONS

Hu( Optimum Operation Condition of an Ultrasonic Motor Driving Fluid Directly, Journal of Applied Physics, vol. 35, pp. 3289-3294. May 1996).*

* cited by examiner

*Primary Examiner*—Quyen P Leung
*Assistant Examiner*—Karen B Addison
(74) *Attorney, Agent, or Firm*—Cooper & Dunham LLP

(57) ABSTRACT

The invention relates to a piezoelectric drive unit and a method for generating a preferably rotating drive movement for such a drive unit. The drive unit comprises a stator (1), a rotor, embodied to rotate about a rotational axis (2), with relation to the stator and drive elements, preferably in the form of several piezoelectric actuators (8). The drive unit further comprises an annular gap (4'), filled with a fluid medium (10), arranged between the facing surfaces of the stator (1) and the rotor (2), several piezoelectric actuators (8a, 8d), arranged adjacent to the gap, which perform an essentially radial length change in the direction of the gap (4') on electrical activation, such that the mechanical energy, provided by the actuators, is transformed into flow energy of the fluid medium, whereby the flow energy of the fluid medium is transmitted to the rotor (2) and transformed into a rotating drive movement of the rotor.

14 Claims, 5 Drawing Sheets

PIEZOELECTRIC DRIVE UNIT AND METHOD FOR GENERATING A PREFERABLY ROTATING DRIVE MOVEMENT FOR SUCH A DRIVE UNIT

BACKGROUND OF THE INVENTION

The invention relates to a piezoelectric drive unit and method for generating a preferably rotating drive movement for such a drive unit. The drive unit comprises a stator, a rotor and drive elements preferably in the form of several piezoelectric actuators.

PRIOR ART

Piezoelectric actuators or elements change their length under the influence of a changing electric voltage. This makes it possible and it is also known to achieve a forced movement in a kinematic system such that the translation or rotation of a member can be used up to the point of culminating in a continuous movement. Reference is also made in this context to a traveling wave drive, as described, for example, in W. Schinköthe, M. Hermann: "Aktorik in der Feinwerktechnik", Part 2, IKFF, University of Stuttgart, April 1997. The traveling wave drive is a special type of ultrasonic drive. It exploits the elliptic surface movement of a continuous resonant bending wave. This kind of vibrational state can be generated under certain excitation conditions by the superposition of resonant modes in geometrically closed resonators. Simple geometric bodies such as disks, rings or hollow cylinders are usually used for this purpose. The following comments briefly explain the formation of traveling waves without going into any details on the problem of the modes that are tied to the geometry. First of all, we will look at the equation of a standing wave.

$$y_1 = a \cdot \sin(k \cdot x) \cdot \sin(\omega \cdot t)$$

By adding a second standing wave of the same amplitude that differs by a phase shift in time $\phi_0$ and a phase shift in space $k \cdot x_0$, the resulting vibration produces the following equation:

$$y = y_1 + y_2 = a \cdot \sin(k \cdot x) \cdot \sin(\omega \cdot t) + a \cdot \sin(k \cdot x + k \cdot x_0) \cdot \sin(\omega + \phi_0)$$

Trigonometric conversions transform the original equation into the following form:

$$2y = y_1 + y_2 = a \cdot \cos(k \cdot x - \omega \cdot t) - a \cdot \cos(k \cdot x + \omega \cdot t)$$

$$+ a \cdot \cos(k \cdot x - \omega \cdot t + k \cdot x_0 - \phi_0) - a \cdot \cos(k \cdot x + \omega \cdot t + k \cdot x_0 + \phi_0)$$

For a phase shift in space of $x_0 = \lambda/4$ and a phase shift in time of $\phi_0 = T/4$, the number of traveling waves is reduced to the following equation of a single traveling wave:

$$y = a \cdot \cos(k \cdot x - \omega \cdot t)$$

For a phase shift in time of $\phi_0 = -T/4$, the rotational direction of the traveling wave is reversed. For deviating values of the phase shifts in time and in space, a superposition of circulating and standing waves remains.

Two standing bending waves are the prerequisite for the creation of a traveling wave. FIG. 7a, (top drawing) shows a base material 29 on which two piezoelectric elements 30, 31 are disposed. A standing bending wave can be obtained by the different alignment (polarization) of the individual elements 30, 31 and appropriate activation. If the same voltage U is applied to the two elements 30, 31, the elements lengthen or shorten respectively depending on their polarization as shown in FIG. 7b, resulting in a wave-like deformation of the base material 29. Each element 30, 31 generates a half-wavelength of the sinusoidal standing wave produced. By reversing the polarity of the applied voltage, an opposing bending wave is generated.

According to the prior art, actuators as piezoelectric bending converters or translators are themselves set in longitudinal or bending vibrations, either individually, in groups or in combination with path changing systems, to produce a continuous translatory or rotary movement of a drive member in order to move a selected point on a closed path that is suitable for transmitting this movement by means of friction pairing with an output member. This principle is employed in ultrasonic motors. Other embodiments act by clamping and releasing a transport, in other words, also by using a friction fit. Using an annular arrangement of actuators and their periodic activation, a traveling wave can be generated that, when transmitted to a rotor, sets it in rotation about its rotational axis. Such a rotating embodiment of a piezoelectric motor is revealed, for example, in EP 449 048 B1.

One disadvantage of the known solutions is that the transmission of movement is achieved by using a friction fit. Here, the transmission of power and momenta is determined by the minimum preload required at the pairing point and the coefficient of friction. Moreover, undesirable wearing occurs at the friction pairing point. To ensure correct functioning, piezo motors having a friction fit at the movement transmission point are operated at high frequency. This makes it almost impossible to adjust the speed using the frequency. Finally, the transmittable momenta of these motors, particularly in the case of vibrating benders, are very low.

SUMMARY OF THE INVENTION

It is thus the object of the invention to create a piezoelectric drive unit for generating a preferably rotating drive movement in which the transmission of movement does not rely on a friction fit with all of its disadvantages.

This object has been achieved according to the invention by a drive unit according to the independent patent claim 1. A method for generating a preferably rotating drive movement for such a drive unit is cited in independent patent claim 10.

Preferred embodiments and other advantageous characteristics of the invention are the subject matter of the subordinate claims.

According to the invention, the drive unit comprises an annular gap filled with a fluid medium that is formed between the facing surfaces of the stator and the rotor, several piezoelectric actuators arranged adjacent to the gap which, on electrical activation according to a predetermined scheme or a predetermined function, undergo an essentially radial change in length in the direction of the gap, such that the mechanical energy provided by the actuators is transmitted to the fluid medium as flow energy, wherein the flow energy of the fluid medium is transmitted to the rotor and transformed into a rotating drive movement of the rotor.

The advantage of the invention is that the transmission of movement to the rotor is effected almost completely free of wear owing to the hydrodynamic energy impressed on the fluid medium by means of the piezoelectric actuators. This kind of drive concept is particularly advantageous for motors whose rotor is supported by means of a hydrodynamic bearing system.

In a preferred embodiment of the invention, the piezoelectric actuators are disposed along the circumference of the gap on a common plane, the plane preferably running approximately perpendicular to the rotational axis.

At the same time, the piezoelectric actuators are segmented in form and are adapted to the annular geometry of the gap.

To improve the transmission of the hydrodynamic energy of the fluid to the rotor, a part of the rotor preferably has rib-shaped projections distributed over its circumference, which face the gap and are circulated with the fluid medium.

The rotor can be supported with respect to the stator in a conventional way using roller bearing systems. However, it is advantageous if the rotor is supported in the stator using a hydrodynamic bearing system. In this way, a part of the bearing gap can be simultaneously used as a gap for the drive system. The fluid medium used as a lubricant for the hydrodynamic bearing concurrently acts as a drive medium.

The drive unit can be advantageously designed as a spindle motor for driving the storage disks of a hard disk drive.

According to the method presented in the invention, the transmission of power in the depicted piezoelectric drive unit is effected in accordance with the hydrodynamic principle, wherein the mechanical energy provided by the piezoelectric actuators is transformed into flow energy for a fluid medium, which is then transformed back again by the rotor of the drive unit into mechanical energy.

The rotational speed of the rotor or the attainable torque is dependent, inter alia, on the frequency at which the actuators are driven and the degree of length change (depending on the applied voltage).

Thus the fundamental principles of fluid dynamics can be used to describe the transmission capability of hydrodynamic drives. If we consider the flow of fluid circulating in the gap, the power contained therein is calculated from the size of the flowing mass flow and from the specific energy (speed) impressed on it. The relationships for the flow in the annular gap can be developed from the basic principles worked out by Bernoulli.

For the best possible transmission of power, the flow in the gap is preferably aligned transversely to the rotational axis of the drive unit.

An electronic control device is provided which electrically drives the piezoelectric actuators according to a predetermined scheme or a predetermined function so that a desired flow of the fluid medium is produced in the bearing gap. Piezoelectric actuators located opposite each other with respect to the rotational axis are thereby preferably driven in pairs.

A preferred embodiment of the invention is described in more detail below on the basis of the drawings.

DESCRIPTION OF A PREFERRED EMBODIMENT OF THE INVENTION

Figure 1:
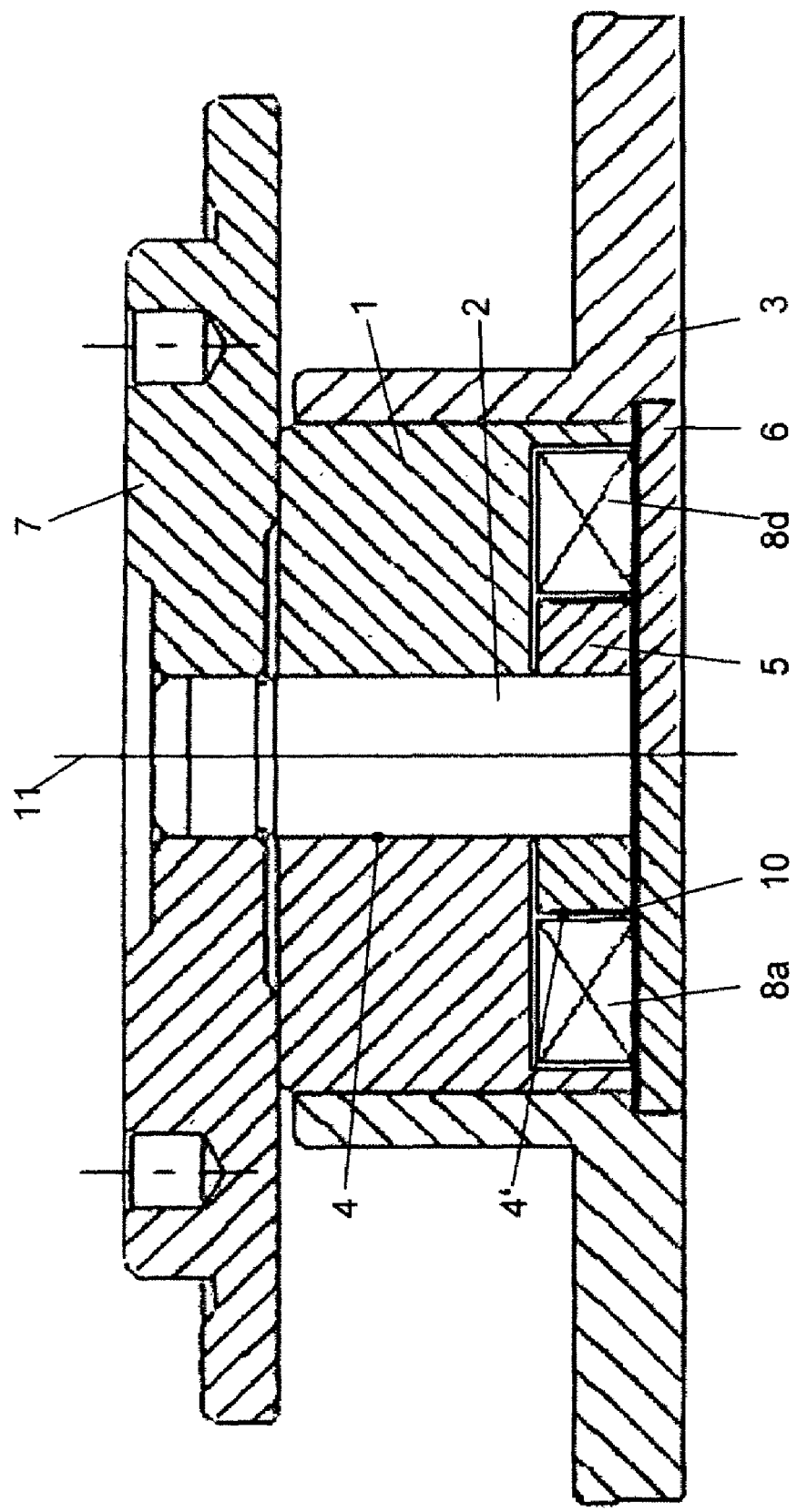
FIG. 1 shows a longitudinal section through a drive unit according to the invention that is designed as a spindle motor.

A drive unit according to the invention designed as a spindle motor is illustrated in FIG. 1, the drive unit can be used, for example, for driving the storage disks of a hard disk drive. The drive unit comprises a stator taking the form of a stationary bearing sleeve 1 having a cylindrical axial bore in which a shaft 2, which can rotate about a rotational axis 11, is accommodated. The bearing sleeve 1 itself is pressfitted into a base flange 3. At least one hydrodynamic radial bearing region having a bearing gap 4 is provided between the inside diameter of the bearing sleeve 1 and the slightly smaller outside diameter of the shaft 2, the bearing gap being filled with a lubricant, preferably a fluid medium 10. This radial bearing region is marked in a well-known manner by a grooved pattern (not illustrated) that is provided on the surface of the shaft 2 and/or on the inner surface of the bearing sleeve 1. As soon as the shaft 2 is set in rotation, as a result of the grooved pattern, hydrodynamic pressure is built up in the bearing gap 4, or in the fluid medium found in the bearing gap, thus giving the bearing its load-carrying capacity.

A hydrodynamic thrust bearing formed at the lower end of the shaft 2 by a thrust plate 5 connected to the shaft 2 and a cover plate 6 provides for the axial positioning of the shaft 2 with respect to the bearing sleeve 1 of the bearing arrangement and takes up the axial loads. This axial bearing region is hermetically sealed by the cover plate 6 so that no bearing fluid can escape from the bearing gap 4, which continues between the thrust plate 5, bearing sleeve 1 and cover plate 6 as bearing gap 4'. To ensure that sufficient hydrodynamic pressure is built up in the axial bearing, the facing surfaces of the thrust plate 5 and/or the cover plate 6 are also provided with a grooved pattern (not illustrated).

The free end of the shaft 2 carries a hub 7 on which one or more storage disks (not illustrated) of the hard disk drive are arranged and fixed.

According to the invention, several piezoelectric actuators (generally indicated by the number 8) are used as drive elements. In the illustrated embodiment, six actuators, 8a, 8b, 8c, 8d, 8e and 8f are provided. However, more than six actuators or less than six may be provided. The piezoelectric actuators 8a-8f are segmented in form and disposed annularly about the thrust plate 5 in a space between the bearing sleeve 1 and the cover plate 6, the bearing gap 4' of the hydrodynamic bearing filled with the fluid medium 10 continuing between the actuators 8 and the thrust plate 5.

The actuators 8 are designed in such a way that when an electric voltage is applied they undergo a radial change in length with respect to the rotational axis 11, this means that the distance between the outside and inside diameters of the actuators 8 changes. Since at least parts of the outer surfaces of the actuators 8 preferably butt firmly against the radially inner surface of the bearing sleeve 1, the change in length of the actuators 8 acts solely in a radially inwards direction in the direction of the gap 4 or the thrust plate 5.

Figures 2A, 2B, 2C:
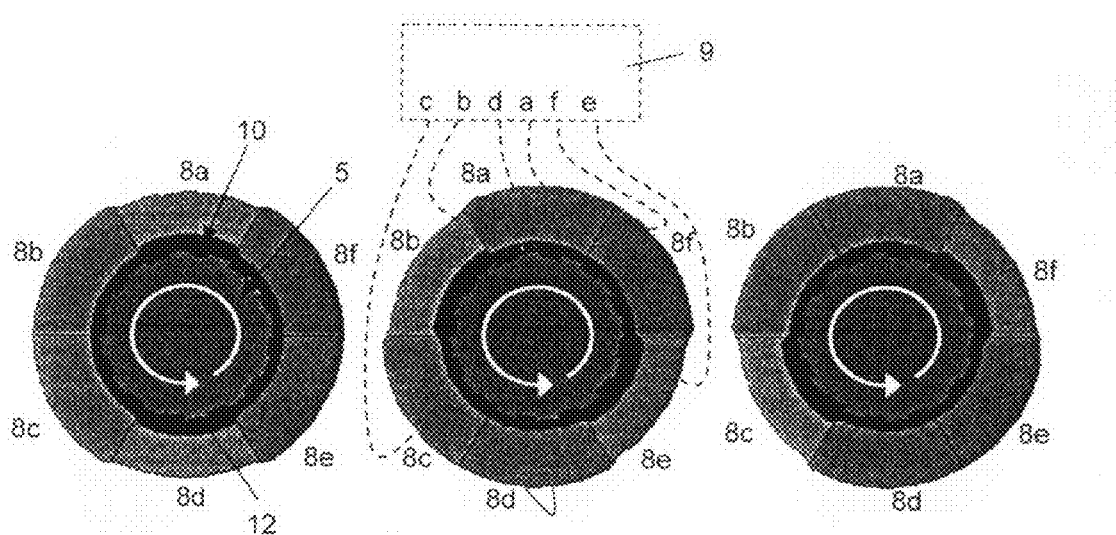
FIG. 2a shows a cross-section of the drive unit in the region of the piezoelectric actuators during a first drive phase.
FIG. 2b shows a cross-section of the drive unit in the region of the piezoelectric actuators during a second, drive phase.
FIG. 2c shows a cross-section of the drive unit in the region of the piezoelectric actuators during a second drive phase.
Figure 3:
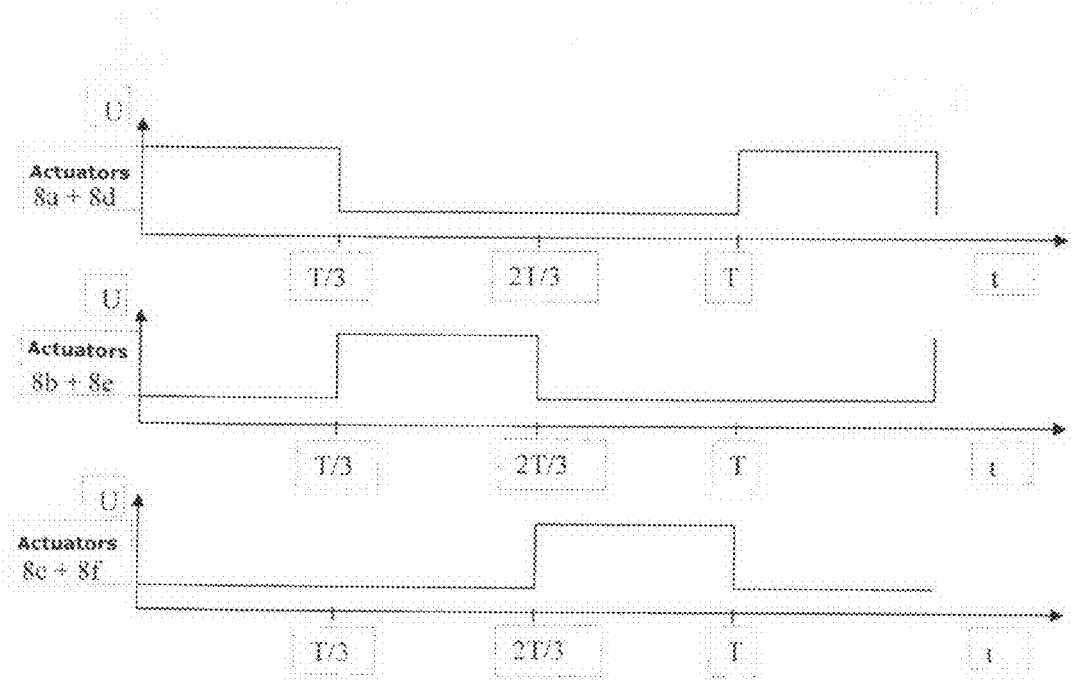
FIG. 3 shows a schematic diagram of the waveform over time of the control voltages applied to the piezoelectric actuators.

As schematically shown in FIG. 2b, a control device 9 is provided that is connected to the individual actuators 8a-8f via connecting lines. The piezoelectric actuators 8a-8f are driven according to a predetermined scheme or a predetermined function by means of the control device 9. FIG. 3 shows a simple example for the possible waveform over time of the control voltages applied to the actuators 8a-8f. The actuators are preferable driven periodically in pairs. Here, the actuator pairs 8a+8d, 8b+8e and 8c+8f are each driven successively for a third of a period T.

According to FIG. 2a, the actuators 8a-8f contract in a radial direction on activation, so that the gap 4' adjacent to these actuators widens. This results in a vacuum being briefly created in the medium 10 which is compensated by the medium flowing in the direction of this section of the gap. As can be seen in FIG. 2b, actuators 8a+8d are now switched off and actuators 8b+8e are activated so that the medium is forced to flow anti-clockwise in the direction of actuators 8b+8e. Finally, in accordance with FIG. 2c, actuators 8c+8f are activated so that the medium flows in the direction of this section of the gap. The cycle repeats itself here with the activation of actuators 8a+8d.

As a result of the alternating activation of the actuator pairs 8a+8d, 8b+8e and 8c+8f, pressure differences are generated in the fluid medium 10 which continue in the form of a traveling wave, so that the fluid medium 10 in the bearing gap 4' is put into a circular flow. The flow energy of the fluid medium in the gap 4' is transmitted to the thrust plate 5 and transformed back into mechanical energy which sets the rotor, consisting of thrust plate 5, shaft 2 and hub 7, into rotation.

In order to achieve improved transmission of the flow energy of the medium 10 to the thrust plate 5, the thrust plate 5 is preferably provided with rib-shaped projections 12 at its outside circumference that are circulated with the medium. These projections 12 set up a resistance to the medium and act like the blades of a turbine.

Figure 4:
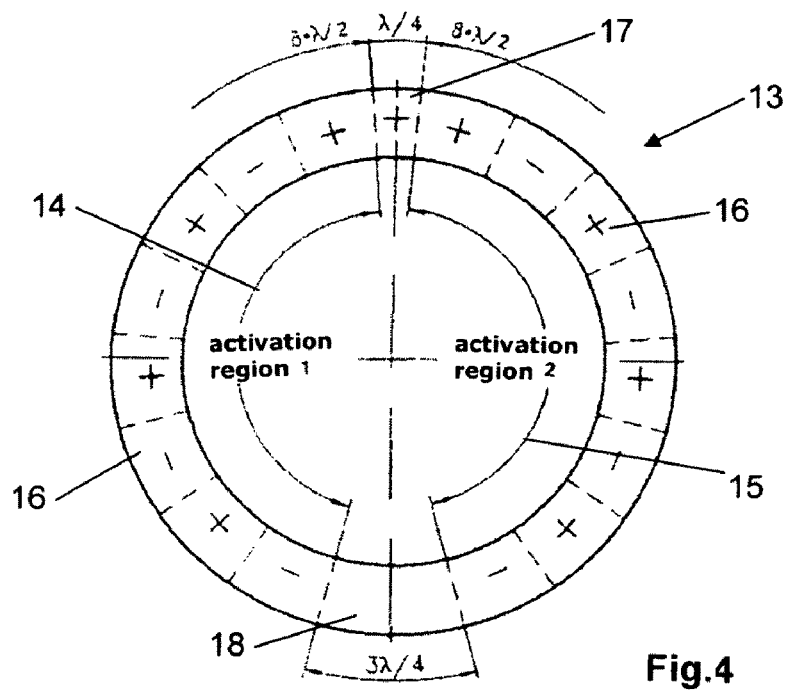
FIG. 4 shows a plan of an annular piezoceramic arrangement (taken from Schinköthe et al)

According to another embodiment of the invention, for the generation of a traveling wave in the stator of the motor, two standing waves are activated through an appropriate arrangement and wiring of piezoelectric actuators. A piezoceramic ring 13 is illustrated in FIG. 4 for the purpose of explaining this principle. At its circumference, the ring 13 is divided into two activation regions 14, 15, each of which generates a standing wave. Each activation region 14, 15 contains, for example, eight piezoelectric segmented actuators 16 whose alternating polarization is indicated by the different signs "+" or "−". The formation of a pure traveling wave is based on the condition that the phase shifts in space and time of $\pi/2$ or T/4 respectively are maintained. The phase difference in space can be realized by an additional intermediate segment 17 of length $\lambda/4$ between the two activation regions. The ring 13 is driven at the ninth bending natural frequency. There are accordingly 9 $\lambda$ at the circumference, which is why a second intermediate segment 18 of length $3\lambda/4$ is necessary between the two activation regions 14, 15. The required phase difference in time of T/4 is achieved by the different activation of the two activation regions 14, 15.

If, for example, the first activation region 14 is activated with a signal $U=\hat{U}\sin(\omega t)$, the activation of the second activation region 15 with a signal $U=\hat{C}\cos(\omega t)$ satisfies the phase condition in time. By swapping the two activation signals, the direction of the traveling wave and thus the direction of rotation of the motor can be reversed. The intermediate section 17 of length $\lambda/4$ can act simultaneously as a sensor to control the vibrational state. The other intermediate segment 18 of length $3\lambda/4$ is not connected.

Figure 5:
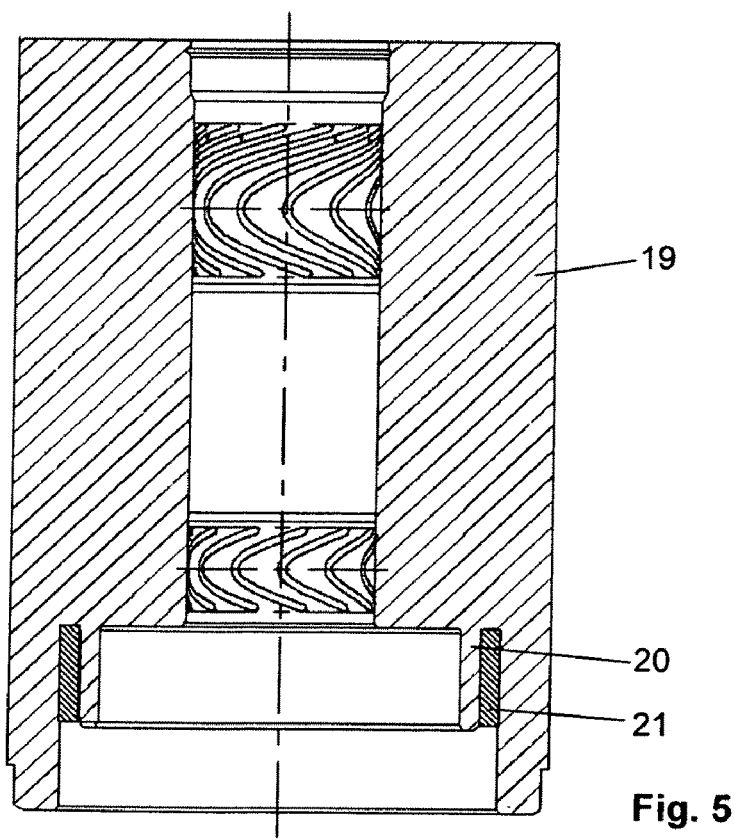
FIG. 5 shows a bearing sleeve as part of a hydrodynamic sliding bearing for the integration of a piezoelectric drive unit.

The annular piezoceramic arrangement illustrated in FIG. 4, could be equally realized as a cylindrical arrangement, which may be used in a drive unit according to FIG. 5. FIG. 5 shows a bearing sleeve 19 forming part of a hydrodynamic sliding bearing in which a piezoelectric drive unit can be integrated. The bearing sleeve can be used, for example, in exchange for the bearing sleeve 1 illustrated in FIG. 1.

Analogous to the bearing sleeve illustrated in FIG. 1, bearing sleeve 19 comprises a bore to receive a shaft (not illustrated) and a widened bore to receive a thrust plate (not illustrated) fixed to the shaft. Analogous to FIG. 1, here again there is a bearing gap filled with a bearing fluid between the surfaces of the shaft, thrust plate and bearing sleeve. The boundary of the widened bore is formed by a cylindrical collar 20 having a thin wall thickness. This collar 20 acts as a carrier and a resonance body for a cylindrical piezoceramic ring 21 that is fixed at the outside circumference of the collar. The segmentation of the ring 21 can correspond to FIG. 4.

The piezoceramic ring 21 preferably only butts against the side of the bearing bush 19 that faces the shaft. When the piezoceramic arrangement is activated in a way analogous to the above-described method, a traveling wave is generated and transmitted to the collar 20 as an additional resonator. The traveling wave puts the bearing fluid located between the outside circumference of the thrust plate and the inside circumference of the collar 20 in a directed, circular movement. The flow energy of the bearing fluid is transmitted to the thrust plate which is consequently set in rotation and thus drives the shaft in rotation.

Figure 6A:
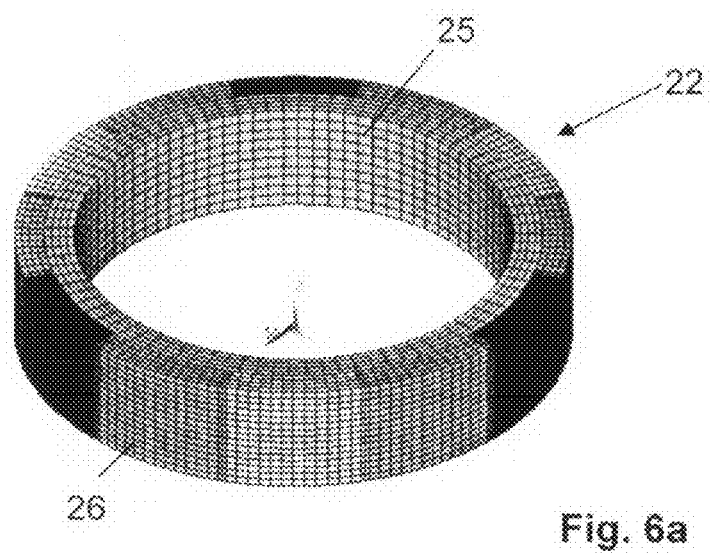
FIG. 6 shows further possible embodiments of piezoceramic arrangements.
Figure 6B:
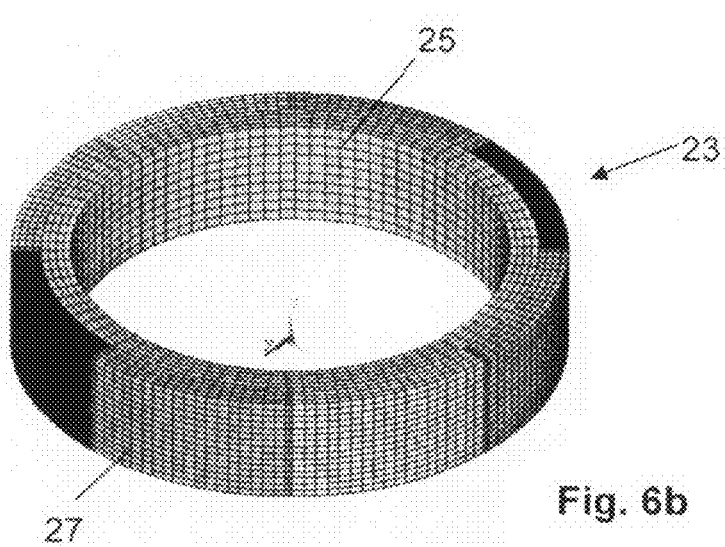
Figure 6C:
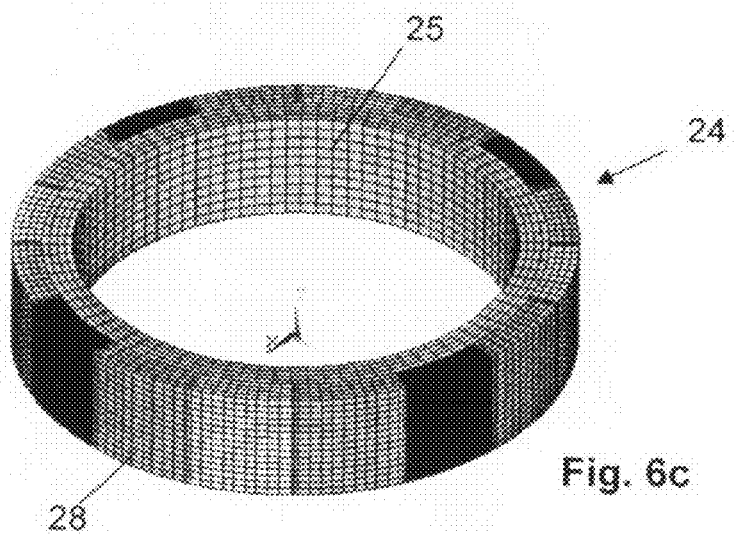
Figure 7:
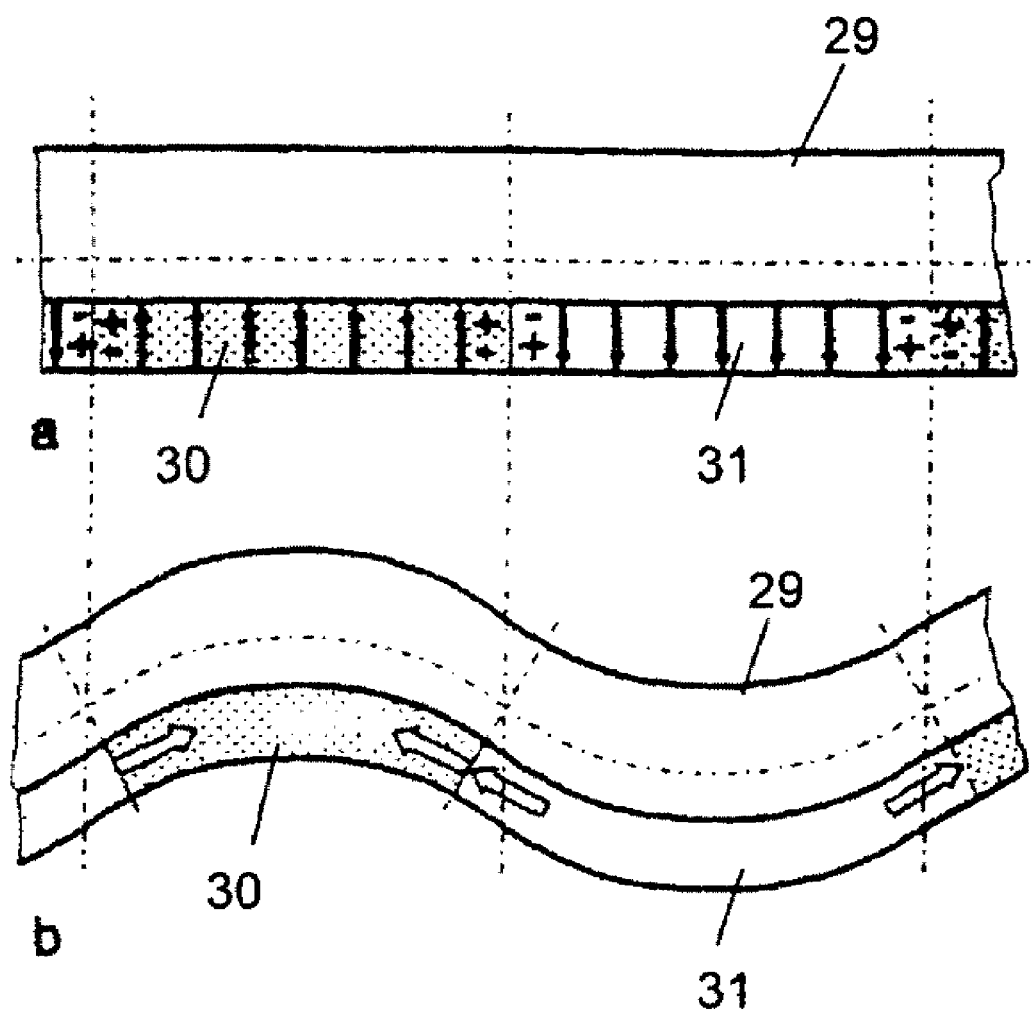
FIG. 7 shows a piezoceramic arrangement mounted onto a base material at a standstill and in an activated state (taken from Schinköthe et al).

Other possible embodiments of piezoceramic arrangements 22, 23, 24 are shown in FIGS. 6a, 6b and 6c. The piezoelectric actuators are thereby always disposed on the circumference of an implied resonator 25 (cf. the collar in FIG. 5).

The arrangement 22 according to FIG. 6a comprises 12 piezoelectric segmented actuators which are activated alternately in groups of three, in a similar way as described in conjunction with FIG. 2. The arrangement 23 according to FIG. 6b comprises 8 piezoelectric actuators 27 which are activated alternately in pairs, in a similar way as described in conjunction with FIG. 2.

The arrangement 24 according to FIG. 6c comprises 16 piezoelectric actuators 27 which are activated alternately in groups of four, in a similar way as described in conjunction with FIG. 2.

IDENTIFICATION REFERENCE LIST

1 Bearing sleeve, stator
2 Shaft
3 Base flange
4 Bearing gap 4'
5 Thrust plate
6 Cover plate
7 Hub
8 Piezoelectric actuators (8a-8f)
9 Control device
10 Fluid medium
11 Rotational axis
12 Projections
13 Piezoceramic ring
14 Activation region
15 Activation region
16 Actuator, piezoelectric, segmented
17 Intermediate segment
18 Intermediate segment
19 Bearing sleeve, stator
20 Collar
21 Piezoceramic ring
22 Piezoceramic arrangement
23 Piezoceramic arrangement
24 Piezoceramic arrangement
25 Resonator
26 Actuator, segmented 27 Actuator, segmented
28 Actuator, segmented
29 Base material
30 Piezoelectric element
31 Piezoelectric element

The invention claimed is:

1. A piezoelectric drive unit for generating a rotating drive movement comprising: a stator (1), a rotor (2,5,7) rotatable about a rotational axis (11) with respect to the stator, and drive elements taking the form of several piezoelectric actuators (8), an annular gap (4') filled with a fluid medium (10) that is formed between the facing surfaces of the stator (1) and the rotor (2,5,7), a plurality of piezoelectric actuators (8a-8f) arranged adjacent to the gap which, on electrical activation according to a predetermined scheme or a predetermined function, undergo an essentially radial change in length in the direction of the gap (4'), such that the mechanical energy provided by the actuators is transmitted to the fluid medium as flow energy, wherein the flow energy of the fluid medium is transmitted to the rotor and transformed into a rotating drive movement of the rotor (2; 5;7), characterized in that
the rotor (2;5;7) is supported in the stator using a hydrodynamic bearing system, wherein the gap (4') forms part of the gap (4) of the hydrodynamic bearing system and the hydrodynamic bearing comprises a grooved pattern on its bearing surfaces for building up a hydrodynamic pressure within the bearing gap when the rotor is rotated.

2. A piezoelectric drive unit according to claim 1, characterized in that the piezoelectric actuators (8a-8f) are disposed along the circumference of the gap (4').

3. A piezoelectric drive unit according to claim 1 characterized in that the stator (19) has a collar (20) that acts as a resonator and forms the outer limit of the gap, wherein a piezoceramic ring (21;22;23;24) that comprises several piezoelectric actuators (16;26;27;28) is arranged at the outside circumference of the collar (20).

4. A piezoelectric drive unit according to claim 1 characterized in that the piezoelectric actuators (8a-8f) are disposed on one plane.

5. A piezoelectric drive unit according to claim 1 characterized in that the piezoelectric actuators (8a-8f) are segmented in form.

6. A piezoelectric drive unit according to claim 1 characterized in that a part (5) of the rotor has rib-shaped projections (12) distributed over its circumference which face the gap (4') and are circulated with the fluid medium.

7. A piezoelectric drive unit according to claim 1 characterized in that the drive unit is designed as a spindle motor.

8. A piezoelectric drive unit according to claim 1 characterized in that the drive unit forms apart of a hard disk drive.

9. A method for generating a rotating drive movement for a drive unit comprising a stator (1) and a rotor (2;5;7), wherein a plurality of piezoelectric actuators (8) are used as drive elements, wherein the mechanical energy provided by the piezoelectric actuators (8a-8f) is transformed into flow energy (hydrodynamic energy) for a fluid medium (10), and the flow energy of the fluid medium is transmitted to the rotor and transformed into a rotating drive movement of the rotor (2;5;7), characterized in that
the flow energy is generated within a bearing gap (4') that, together with a bearing gap (4), forms a part of a hydrodynamic bearing system having groove patterns on its bearing surfaces and that hydrodynamic pressure is built up in the bearing gap (4,4") through the rotation of the rotor (2;5;7), thus giving the bearing its load-carrying capacity.

10. A method according to claim 9, characterized in that the fluid medium is accommodated in the substantially annular gap (4'), wherein the piezoelectric actuators (8a-8f) are arranged and activated such that they generate a defined, directed flow of the fluid medium within the gap (4') and the rotor is set into rotation by the flow.

11. A method according to claim 9, characterized in that actuators (l6;26;27;28) act on an annular resonator (20) and excite it to vibration such that a traveling wave is formed whose mechanical energy is transmitted as flow energy to the fluid medium found in the gap.

12. A method according to claim 9, characterized in that the flow in the gap (4') is directed transversely to the rotational axis (11) of the drive unit.

13. A method according to claim 9, characterized in that the piezoelectric actuators (8a-8f) are electrically activated according to a predetermined scheme or a predetermined function.

14. A method according to one claim 9, characterized in that piezoelectric actuators (8a+8d, 8b+8e, 8c+8f) are located opposite each other with respect to the rotational axis (11) and are driven in pairs.

* * * * *